United States Patent
Sterz et al.

(10) Patent No.: US 12,452,968 B2
(45) Date of Patent: Oct. 21, 2025

(54) OPERATION OF A DOMESTIC MICROWAVE APPLIANCE AS A FUNCTION OF A MICROWAVE GENERATOR TEMPERATURE

(71) Applicant: BSH Hausgeräte GmbH, Munich (DE)

(72) Inventors: Sebastian Sterz, Großaitingen (DE); Markus Kuchler, Gstadt am Chiemsee (DE); Kerstin Rigorth, Mühldorf (DE)

(73) Assignee: BSH Hausgeräte GmbH, Munich (DE)

( * ) Notice: Subject to any disclaimer, the term of this patent is extended or adjusted under 35 U.S.C. 154(b) by 962 days.

(21) Appl. No.: 17/624,858

(22) PCT Filed: Jul. 14, 2020

(86) PCT No.: PCT/EP2020/069867
§ 371 (c)(1),
(2) Date: Jan. 5, 2022

(87) PCT Pub. No.: WO2021/013634
PCT Pub. Date: Jan. 28, 2021

(65) Prior Publication Data
US 2022/0264708 A1    Aug. 18, 2022

(30) Foreign Application Priority Data

Jul. 25, 2019    (DE) .................... 10 2019 211 065.7

(51) Int. Cl.
*H05B 6/64* (2006.01)
*H05B 6/72* (2006.01)
(Continued)

(52) U.S. Cl.
CPC ............. *H05B 6/645* (2013.01); *H05B 6/705* (2013.01); *H05B 6/725* (2013.01); *H05B 6/745* (2013.01)

(58) Field of Classification Search
CPC .. H05B 2206/043; H05B 6/645; H05B 6/666; H05B 6/70; H05B 6/705; H05B 6/725; H05B 6/745
(Continued)

(56) References Cited

U.S. PATENT DOCUMENTS 7,834,299 B2* 11/2010 Claesson .............. H05B 6/6476
219/757
2009/0230949 A1   9/2009 Moriya

FOREIGN PATENT DOCUMENTS

CN         2349239 Y    11/1999
CN       109413789 A     3/2019
(Continued)

OTHER PUBLICATIONS

International Search Report PCT/EP2020/069867 dated Oct. 6, 2020.
National Search Report CN 202080053303.3 date Jan. 9, 2024.

*Primary Examiner* — Quang T Van
(74) *Attorney, Agent, or Firm* — Michael E. Tschupp; Brandon G. Braun; Andre Pallapies

(57) ABSTRACT

In a method for operating a household microwave appliance, a microwave treatment operation is controlled as a function of a temperature of a microwave generator. The household microwave appliance includes a cooking chamber, a microwave generator for routing microwaves to the cooking chamber, a temperature-determining apparatus for determining a temperature of the microwave generator, a microwave distribution device designed to change a field distribution in the cooking chamber during a microwave treatment operation, and a control device designed to control the microwave treatment operation as a function of the temperature of the microwave generator effected by a change in the field distribution.

18 Claims, 3 Drawing Sheets

(51) Int. Cl.
*H05B 6/70* (2006.01)
*H05B 6/74* (2006.01)

(58) Field of Classification Search
USPC ....... 219/709, 681, 682, 685, 739, 746, 748, 219/750, 754, 756, 757, 400; 126/21 A, 126/198, 273 A, 299 D, 299 R
See application file for complete search history.

(56) References Cited

FOREIGN PATENT DOCUMENTS

| | | |
|---|---|---|
| DE | 102004015993 A1 | 11/2005 |
| DE | 102016117922 A1 | 3/2018 |
| EP | 2487990 A1 | 8/2012 |
| EP | 2993961 A1 | 3/2016 |
| GB | 2321764 A | 8/1998 |
| JP | H0195493 A | 4/1989 |
| JP | H05109475 A | 4/1993 |
| JP | 2001254952 A | 9/2001 |
| JP | 2018078034 A | 5/2018 |
| KR | 20010066582 A | 7/2001 |
| WO | 2004008809 A | 1/2004 |

\* cited by examiner

OPERATION OF A DOMESTIC MICROWAVE APPLIANCE AS A FUNCTION OF A MICROWAVE GENERATOR TEMPERATURE

CROSS-REFERENCES TO RELATED APPLICATIONS

This application is the U.S. National Stage of International Application No. PCT/EP2020/069867, filed Jul. 14, 2020, which designated the United States and has been published as International Publication No. WO 2021/013634 A1 and which claims the priority of German Patent Application, Serial No. 10 2019 211 065.7, filed Jul. 25, 2019, pursuant to 35 U.S.C. 119(a)-(d).

The contents of International Application No. PCT/EP2020/069867 and German Patent Application, Serial No. 10 2019 211 065.7 are incorporated herein by reference in their entireties as if fully set forth herein.

BACKGROUND OF THE INVENTION

The invention relates to a method for operating a household microwave appliance as a function of a temperature of a microwave generator. The invention also relates to a household microwave appliance, having a cooking chamber, a microwave generator, a temperature-determining apparatus for determining a temperature of the microwave generator, at least one microwave distribution device and a control device, wherein the control device is designed to carry out the method as claimed in one of the preceding claims. The invention can be applied particularly advantageously to stand-alone microwave appliances or combination appliances, ovens, in particular baking ovens, with microwave functionality or microwave appliances with additional thermal radiators.

It was previously known to measure a magnetron temperature, in order to determine an idling of the cooking appliance or a malfunction of the magnetron cooling and to avoid an overheating of the magnetron which occurs as a result. The magnetron is switched off if a predetermined temperature threshold is reached.

GB 2321764 A therefore discloses a temperature sensor, which is fastened to a support made from a heat-conducting material, which is removably attached to a cooling fin of a magnetron of a microwave oven in order to measure a temperature, which is representative of the temperature of an anode block of the magnetron. If this temperature increases to excessively high values, which indicates abnormal conditions such as an absent load (idling) or a malfunction of the cooling, the power supply of the magnetron is interrupted.

EP 2 993 961 A1 describes an idling detection, which is likewise based on the measurement of the magnetron temperature. The idling is detected on the basis of the gradient of the temperature curve or a maximum temperature being reached, and as a result the heat output is reduced or completely switched off. EP 2 378 204 A1 and EP 1 594 345 A1 likewise focus on measuring the magnetron temperature, in order to avoid an idling of the cooking appliance.

DE 10 2016 117 922 A1 discloses a method for operating a magnetron for a cooking appliance which has a cathode. The power input, in particular the high voltage supply, of the magnetron is controlled or regulated as a function of a safety state. Furthermore, a microwave source and a cooking appliance are described.

DE 10 2004 015 993 A1 discloses a microwave appliance or a combination appliance with microwave operation. This appliance comprises a) at least one cooking chamber for food to be cooked, b) at least one device for generating microwaves, c) one or more temperature sensors, in particular for detecting the cooking chamber temperature and/or for detecting the temperature of the device for generating microwaves, wherein each of the temperature sensors generates a measuring signal, and d) at least one evaluation device, with which, on the basis of the development over time of the measuring signal of at least one of the temperature sensors during microwave operation, the load state of the cooking chamber, in particular an idling operation of the microwave appliance, can be determined. Furthermore, a method for operating a microwave appliance is specified, in which the development over time of the measuring signals of at least one of the temperature sensors during microwave operation is used to determine the load state of the cooking chamber, in particular to determine an idling operation of the microwave appliance.

EP 2 194 758 B1 discloses a state detection apparatus for detecting an operating state of a high frequency heating apparatus, which contains a magnetron for generating microwaves, wherein the apparatus comprises: a section for determining a movement position, with which a movement position of a radio wave stirring element is determined, which operates periodically in order to stir the microwaves generated by the magnetron relatively in relation to a heated object; an anode current input section, with which a detected anode current of the magnetron is input; and a determination section, with which a period of a periodic movement of the radio wave stirring element is determined on the basis of information regarding the movement position which is determined with the section for determining a movement position, then a corresponding value, which corresponds to the anode current input by way of the anode current input section, is read repeatedly during a period and the operating state of the high frequency heating apparatus is determined on the basis of a plurality of corresponding values during a period.

BRIEF SUMMARY OF THE INVENTION

It is the object of the present invention to overcome the disadvantages of the prior art at least partially and in particular to provide an improved possibility of operating a household microwave appliance as a function of a temperature of a microwave generator.

This object is achieved according to the features of the independent claims. Advantageous embodiments form the subject matter of the dependent claims, the description and the drawings.

The object is achieved by a method for operating a household microwave appliance, in which a microwave treatment operation is controlled as a function of a temperature of a microwave generator.

This method is advantageous in that, contrary to the prior art, the temperature of the microwave generator is now used to control a microwave treatment operation as such, for instance in order to obtain an improved cooking result, to reduce a treatment duration and/or to achieve an energy saving. In other words, the method is not intended to detect, on the basis of the temperature of the microwave generator, states such as an idling or a failure to cool which are critical to the operation of the microwave generator, in order then to be able to take countermeasures. Instead, the method is intended to better activate a microwave treatment operation of food which runs correctly (not influenced by critical states of the microwave generator). In the microwave treatment operation which runs correctly, food or a microwave-absorbing load in particular is disposed in the cooking chamber. One further advantage is that such a control can be realized with technically easily implementable and cost-effective means.

During the injection of microwaves into the cooking chamber, this method makes full use of a specific portion thereof being reflected back again to the microwave generator and thus resulting in an increase in a temperature of the microwave generator. Typically, the greater the increase in temperature, the greater the power of the back-reflected microwaves. During a typical microwave treatment operation, the field distributions in the cooking chamber are frequently targetedly changed, in order to avoid static hotspots. It is also known to control a microwave treatment operation so that a particularly high microwave absorption in the cooking chamber/minimal reflection to the microwave generator occurs, in order to achieve a high efficiency. By determining the temperature (e.g. measured as an absolute temperature, increase in temperature etc.) on the microwave generator, it is currently possible to at least roughly deduce the back-reflected microwave power for one or more field distributions. This in turn can be used to targetedly set field distributions which, for the purpose of the current treatment of the food disposed in the cooking chamber, have an advantageous property, in particular absorption/reflection portion. For instance, unfavorable field distributions or associated operating parameters can be detected for introducing energy into the food and ruled out for the further course of a microwave treatment procedure.

Another advantage of the method consists in the temperature of the microwave generator enabling a temporally rapid control of the microwave treatment operation.

The household microwave appliance can be a standalone microwave appliance or a combination appliance such as an oven, in particular baking oven, with microwave functionality or a microwave appliance with additional thermal radiators such as resistance heating elements etc.

The microwave generator can be a magnetron or a semiconductor-based microwave generator. The microwave generator can be an inverter-controlled microwave generator. In one development, the microwave generator can have a number of feed points for feeding or injecting microwaves into the cooking chamber. In particular, the microwaves fed in at different feed points can have a phase difference or a phase offset in relation to one another. In one development, this phase offset can be targetedly set by the appliance.

It is also possible for the household microwave appliance to have a number of microwave generators, which have different feed points for feeding or injecting microwaves into the cooking chamber. In particular, the microwaves fed in at different feed points can have a phase offset in relation to one another. In one development, this phase offset can be targetedly set by the appliance.

A microwave treatment operation is understood to mean in particular an operating procedure of the household microwave appliance, in which food is treated by applying microwaves, for instance for cooking, boiling, defrosting etc. The food can be food to be cooked such as groceries, water etc.

The control as a function of the temperature of the microwave generator comprises in particular a change in the application of microwaves to the item to be treated by normal or correct changes to setting parameters provided for a microwave treatment operation. A change in the application of microwaves on account of emergency measures is in particular not included in the present method. However, it cannot be ruled out also to provide a reduction in power in the microwave generator when a critical temperature threshold value is reached.

The control of the microwave treatment operation as a function of a temperature of the microwave generator can comprise a control as a function of an absolute temperature, a temperature difference and/or a change in temperature etc.

The temperature of the microwave generator can be measured for instance by at least one temperature sensor or derived by way of other measured values. The temperature of the microwave generator can be measured directly on the microwave generator or indirectly at another point. For instance, a temperature sensor between cooling fins can be fastened directly to an anode block of the microwave generator. The direct fastening to an anode block of a magnetron is particularly advantageous since at this location the lowest thermal inertia of the system exists. The change in the application of microwaves and associated therewith the change in the reflection ratios can thus be measured with a particularly high temperature rise and a particularly minimal time delay.

One example of an indirect measurement comprises a measurement of an air temperature after cooling air has passed over the microwave generator, e.g. an air exit temperature of the appliance. A further example of an indirect measurement of the temperature of the microwave generator comprises the measurement or determination of a differential temperature between an air inlet and an air outlet, in order advantageously to fade out variable preheating effects of upstream components.

It is further conceivable to determine the temperature of the microwave generator indirectly by way of operating parameters of an associated inverter (i.e. a high voltage switching power supply for actuating the microwave generator), since heating current, anode current and anode voltage are dependent upon the temperature of the microwave generator.

In one embodiment, a field distribution in a cooking chamber of the household microwave appliance is changed during the microwave treatment operation and the microwave treatment operation is controlled as a function of a change in temperature of the microwave generator caused by the change in the field distribution. As a result, the advantage is achieved that properties of specific field distributions can be defined on the basis of changes in temperature upon the transition or change between different field distributions and then specific field distributions which are advantageous for the microwave treatment operation can be selected or set in order to achieve a specific purpose or scenario. The change in field distribution is carried out in a targeted manner by changing at least one operating parameter of the household microwave appliance. The field distribution can also be referred to as a "mode image".

A further advantage is that the change in temperature on the microwave generator occurs comparably quickly or with only a minimal time delay after a change in the field distribution. Contrary to this, effects of a change in the field distribution could until now only be determined by way of a change in temperature of the food to be cooked, e.g. by means of a roasting thermometer or an infrared image. However, the change in temperature of the food to be cooked can only be defined with a considerable delay since food to be cooked has a high thermal inertia. Contrary to this, with the present method reliable measuring results can already be acquired after a few seconds.

In one development, the change in the field distribution is carried out with the output power of the microwave generator remaining unchanged. This is advantageous in that the effect of a change in the field distribution or the mode image can be detected particularly clearly. It is also possible however to adjust the output power of the microwave generator as a function of the temperature or change in temperature on the microwave generator to specific target variables such as a microwave power which is absorbed or reflected as consistently as possible.

In one embodiment, the field distribution is changed by changing a setting value of at least one operating parameter of at least one microwave distribution device which changes the field distribution. The field distribution can be changed particularly accurately in this way.

In one development, the microwave distribution device has at least one settable operating parameter, which can assume at least two values ("setting values"). If the setting value is changed, the field distribution generally also changes. In this process the change during the switchover between two setting values can be significant or also only minimal. A microwave distribution device can have one or more such operating parameters.

In one embodiment, at least one setting value from the group of the following operating parameters is changed:
Angle of rotation of a rotary antenna;
Height position of a rotary antenna;
Relative angle between two blades of a rotary antenna;
Angle of rotation of a mode stirrer;
Height position of a mode stirrer;
Angle of rotation of a rotary plate;
Microwave frequency;
Phase offset between different feed points;
Activation or deactivation of a feed of microwaves by way of a number of feed points;
Change in power distribution between a number of feed points.

A rotary antenna is typically used to inject microwaves into the cooking chamber, in particular from a microwave guide connected to the microwave generator. The rotary antenna frequently has one or more blades which project laterally from an axis of rotation and can be rotated e.g. by means of a stepper motor. The rotary antenna has the angle of rotation $\varphi$ as an operating parameter, which can for example have a value range of [0°; 180°] or, if the rotary antenna can be rotated wholly about itself, of [0°; 360°], e.g. in steps of 1°, 5°, 10° etc. An adjustment of the angle of rotation is typically used to change a field distribution in the cooking chamber, e.g. in order to avoid static hotspots.

A rotary antenna can additionally be height-adjustable, wherein it then has the height position as a further operating parameter. The height position can also be used to change a field distribution in the cooking chamber.

If the rotary antenna has two or more blades, in one development, at least two of them can be adjusted relative to one another about the axis of rotation of the antenna, e.g. in steps of 1°, 5°, 10° etc. The relative angle can also be used to change a field distribution in the cooking chamber.

The field distribution in the cooking chamber can also be changed so that an angle of rotation, and if possible, a height position of a mode stirrer or "stirrer" are changed in the cooking chamber. The mode stirrer is primarily provided to change the field distribution.

The field distribution can also be changed by setting an angle of rotation of a rotary plate, particularly if an asymmetrically shaped item to be treated is located thereupon.

Since the cooking chamber forms a resonance body for the microwaves, the field distribution can also be changed by setting a microwave frequency. For instance, the microwaves can be varied in a range [2.4 GHz; 2.5 GHz], e.g. in steps of 0.001 GHz or 1 MHz.

In one embodiment, an extent of a change in a portion of the microwave power irradiated into the cooking chamber and back-reflected out of the cooking chamber to the microwave generator is determined from the change in temperature. Such a determination can be implemented particularly easily and rapidly. Therefore, for two consecutive different field distributions or mode images, their back-reflected microwave powers can be compared roughly, e.g. the second field distribution can have a portion of back-reflected microwave power which is larger, approximately of the same size or smaller than the first field distribution. This is analogous to the statement that the portion of microwave power absorbed or dissipated in the cooking chamber for the second field distribution is smaller, approximately of the same size or larger than with the first field distribution. In this embodiment, it is therefore possible to determine on the basis of the change in temperature whether a portion of microwave power which is back-reflected to the microwave generator is higher, equally high or lower for a field distribution before a switchover time between different setting values or for a field distribution after this switchover time. Accordingly, depending on the suitability for the present treatment course, the field distribution present after the switchover time can be retained or the setting values can be reset to the values prevailing before the switchover time.

In one embodiment,
a temperature curve is recorded during the microwave treatment operation,
curve gradients before and after a switchover time, at which the field distribution has been changed in the cooking chamber, are determined and
it is determined from the difference in the gradients whether the back-reflected portion of microwave power is higher or lower for the field distribution before the switchover time or for the field distribution after the switchover time.

This gives the advantage of a reliable estimation of the reflected microwave power with a low computing effort. The curve gradients can be determined e.g. by a curve fit of a suitable curve section.

In one development, the gradients are assumed to be gradients of linear or practically linear curve sections ("linear gradient"). This makes a particularly simple evaluation possible. The assumption of the linearity of the curve sections used to determine the gradients is a good assumption in particular for the case that the microwave generator has not yet found its thermal equilibrium or is still only within a heating phase. This development has the further advantage that it is particularly well suited to treatment processes in which the field distribution changes comparatively frequently (e.g. every 5 to 30 seconds).

The curve section can be smoothed in order to determine the gradient, for instance.

In one embodiment, the curve gradient before the switchover time is determined In a curve section which directly precedes the switchover time. This makes possible a particularly reliable comparison with a gradient after the switchover time. If a switchover time is therefore referred to with tp, the gradient of the curve can be determined beforehand in a curve section [tp−Δt1;tp[, wherein Δt1 represents the duration of this curve section.

In one development, the curve gradient is determined from the switchover time, e.g. in a curve section]tp; tp+Δt2]. Δt1=Δt2=Δt may apply.

In one embodiment, the curve gradient is determined from the switchover time, plus a predetermined delay time $\Delta td$. As a result, the advantage is achieved that during the delay time $\Delta td$, effects which occur briefly by resetting the field distribution have no effect on the determination of the gradient. The curve gradient after the switchover time is therefore determined in a curve section $]tp+\Delta td; tp+\Delta td+\Delta t2]$. The delay time $\Delta td$ can amount to e.g. 0.5 to 3 seconds, in particular one to two seconds.

In one embodiment, during the microwave treatment operation, at least one operating parameter of at least one microwave distribution device is set on the basis of the strength of the associated back-reflected portion of the microwave power. A setting of an advantageous field distribution can therefore be assumed particularly easily during a microwave treatment procedure. The combinations of the setting values, which can be set at a shared point in time, can also be referred to as a set of setting values, value tuples or microwave parameter combination (MPC).

For instance, only field distributions or the associated setting values of the at least one operating parameter, in which a low microwave reflection occurs, can be used to heat up liquids. Use is made here of the fact that in order to heat a liquid it is desirable to introduce a high microwave power into this as quickly as possible. In order to achieve this, all MPCs in which a lot of microwave power is reflected can be avoided so that shorter cooking processes are achieved.

One example of the reverse case is a thawing process, in which it is not desirable for an already thawed region to be further heated if still frozen regions are present at other points in the food to be cooked. As soon as thawed regions appear with liquid, the so-called "runaway effect" occurs, since thawed (liquid) regions convert microwave energy more quickly into heat than frozen regions. A uniform thawing process can be supported by avoiding setting values which result in field distributions with a low reflection.

In one development, the method is used to keep the microwave power absorbed in the food to be cooked as constant as possible during a treatment process or procedure. If a state of strong reflection is identified here, the output power of the magnetron can be increased, or vice versa the output power can be reduced if the reflection from the cooking chamber is reduced. As a result, at least approximately the same power is always applied to the food to be cooked during a treatment procedure, even if the field distribution is changed regularly, e.g. in a targeted or random manner, in order to avoid stationary hotspots in the food to be cooked.

Generally in one embodiment, therefore, at least one setting value is set so that a relatively low back-reflected portion of the microwave power is produced.

Generally in another embodiment, at least one setting value is set so that a relatively high back-reflected portion of the microwave power is produced.

During a treatment procedure, the target specifications (e.g. higher or lower back-reflected portion of microwave power) can change. Deep-frozen soup, for example, can firstly be thawed uniformly by avoiding setting values which result in field distributions with a low reflection, and then rapidly heated by setting field distributions with a low reflection.

The object is also achieved by a household microwave appliance, having a cooking chamber, a microwave generator, a temperature-determining apparatus for determining a temperature of the microwave generator, at least one microwave distribution device and a control device, wherein the control device is designed to carry out the method described above. The household microwave appliance can be embodied similarly to the method and has the same advantages.

BRIEF DESCRIPTION OF THE DRAWINGS

The afore-described properties, features and advantages of this invention and the manner in which they are achieved will become clearer and more intelligible in association with the following schematic description of an exemplary embodiment, which is explained in more detail in conjunction with the drawings.

DETAILED DESCRIPTION OF EXEMPLARY EMBODIMENTS OF THE PRESENT INVENTION

Figure 1:
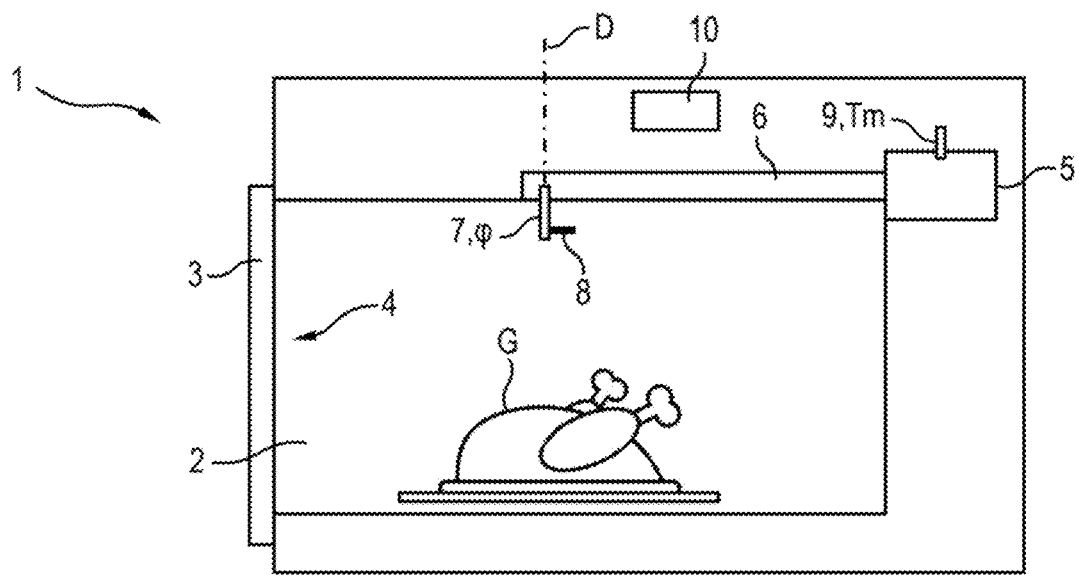
FIG. 1 shows a sectional representation in a side view of a drawing of a household microwave appliance.

FIG. 1 shows a household microwave appliance 1, having a cooking chamber 2, which has a loading opening 4 which can be closed by means of a door 3. The food G can be introduced into the cooking chamber 2 through the loading opening 4. The household microwave appliance 1 further has a microwave generator in the form e.g. of a magnetron 5. Microwaves radiated by the magnetron 5 are routed to the cooking chamber 2 through a microwave guide 6 embodied as a hollow conductor and injected there into the cooking chamber 2 by means of a rotary antenna 7. The rotary antenna 7 has an antenna blade 8 within the cooking chamber 2 and can be rotated about an axis of rotation D (e.g. driven by a stepper motor, not shown). The antenna blade 8 is provided to change a field distribution of the microwaves in the cooking chamber 2 when the rotary antenna 7 is rotating. The rotary antenna 7 is therefore also used as a microwave distribution device. A temperature sensor 9 is attached to the magnetron 5, in order to measure the temperature Tm of the magnetron 5 ("magnetron temperature"). Furthermore, the household microwave device 1 has a control device 10, which is designed inter alia to activate the magnetron 5 (e.g. to set its output power), to read out measured values of the temperature sensor 9 and to set an angular position or angle of rotation $\varphi$ of the rotary antenna 7 about the axis of rotation D.

The control device 10 is further designed (e.g. programmed) to control a microwave treatment operation with food to be cooked G located in the cooking chamber 2 and normally functioning components as a function of the magnetron temperature Tm.

Figure 2:
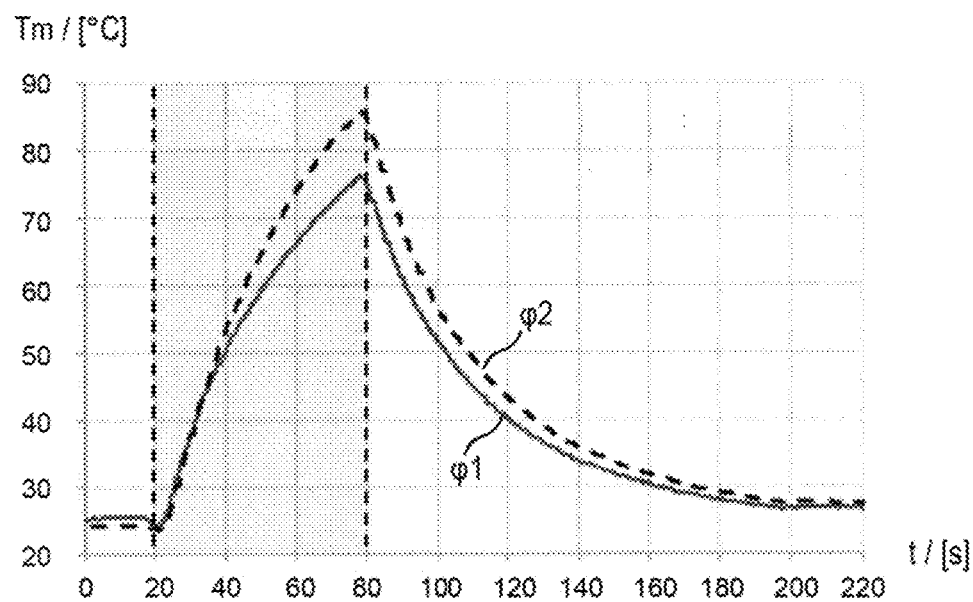
FIG. 2 shows courses of a temperature of a microwave generator of the household microwave appliance for different setting values of a microwave distribution device.

FIG. 2 shows two curve progressions as a plotting of the magnetron temperature Tm in ° C. against a time tin seconds, namely for different angles of rotation $\varphi 1$ and $\varphi 2$ of the rotary antenna 7 with the same microwave power fed into the cooking chamber 2 and an otherwise identical experimental setup. With the experimental setup, a temperature change of a liter of water as the microwave-absorbing load was determined according to a standard method for measuring the actual output power of a microwave appliance. The time range between t=20 s and t=80 s limited by the dashed vertical lines corresponds to the on time or the activation time period of the magnetron 5 of 60 s.

The microwave power introduced into the water load is also determined at the same time as the temperature curve. The setting of the angle of rotation φ1 as a setting value of the operating parameter φ results here, after a minute of treatment or cooking time, in a significantly lower magnetron temperature Tm and a greater increase in temperature of the water load (top fig.) than when the angle of rotation φ2 is set. With the angle of rotation φ1, less power is then reflected back to the magnetron 5, so that a larger portion of fed microwave power is made available for heating the water load.

In the example shown here, a temperature rise in the water load of 11.9° C. was determined for the angle of rotation φ1, which corresponds to a power input of approx. 870 W. With the angle of rotation φ2, conversely, the temperature rise amounted to just 9.8° C., this corresponds to a power input of approx. 710 W (calculation according to IEC 90705). With the angle of rotation φ2, the microwave power reflected back to the magnetron 5 is therefore approx. 160 W higher than at the angle of rotation φ1. This brings about a higher magnetron temperature Tm at the angle of rotation φ2. Therefore, the magnetron temperature Tm toward the end of the on time of the magnetron 5 at the angle of rotation φ1 therefore amounts to approx. 76° C., whereas at the angle of rotation φ2 it amounts to approx. 86° C. Edge effects such as a different heating of elements in the cooking chamber (wall (muffle), glass panels of the door etc.) are present, but not significant.

Figure 3:
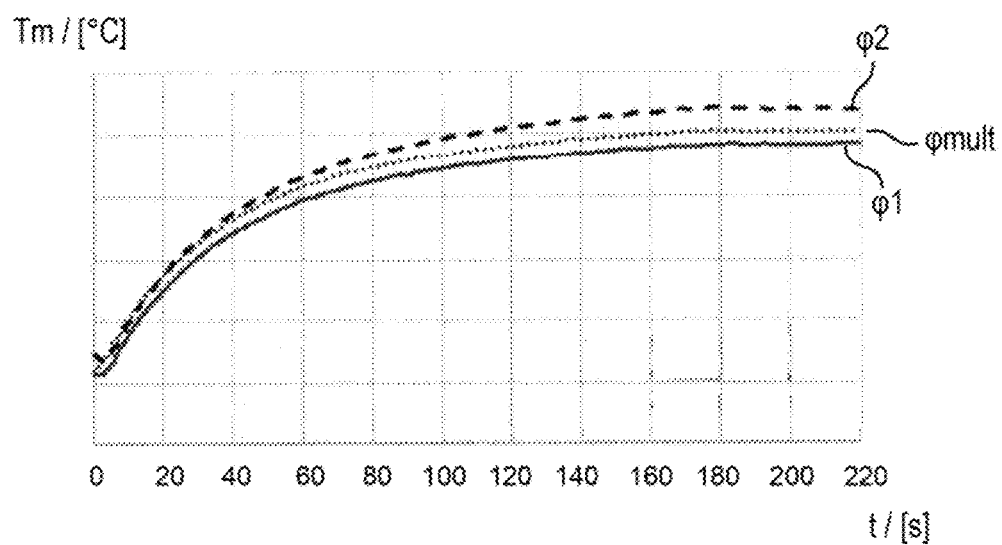
FIG. 3 shows courses of the temperature of the microwave generator until an equilibrium temperature is reached for different setting values of the microwave distribution device.

FIG. 3 shows curve progressions of the magnetron temperature Tm until an equilibrium temperature is reached for different angles of rotation φ1, φ2 and φmult of the rotary antenna 7 with a permanently connected magnetron 5. Here φmult refers to the setting of several values of the angle of rotation φ during the measuring time, in particular a permanent rotation of the rotary antenna 7.

With longer heating processes, the cooling of the magnetron 5 causes it to assume a thermal equilibrium, from which the magnetron temperature corresponds constantly to the respective equilibrium temperature. The equilibrium temperature is dependent upon the selected angle of rotation φ (generally: on the selected set of setting values). A large reflection portion of the microwaves results in a higher equilibrium temperature with a constant cooling power. If, according to the scenario referred to with φmult, the angle of rotation φ varies continuously during the treatment procedure, e.g. by means of antenna rotation, an equilibrium temperature averaged across all angles of rotation φ used develops as a result of the thermal inertia of the magnetron 5.

Figure 4:
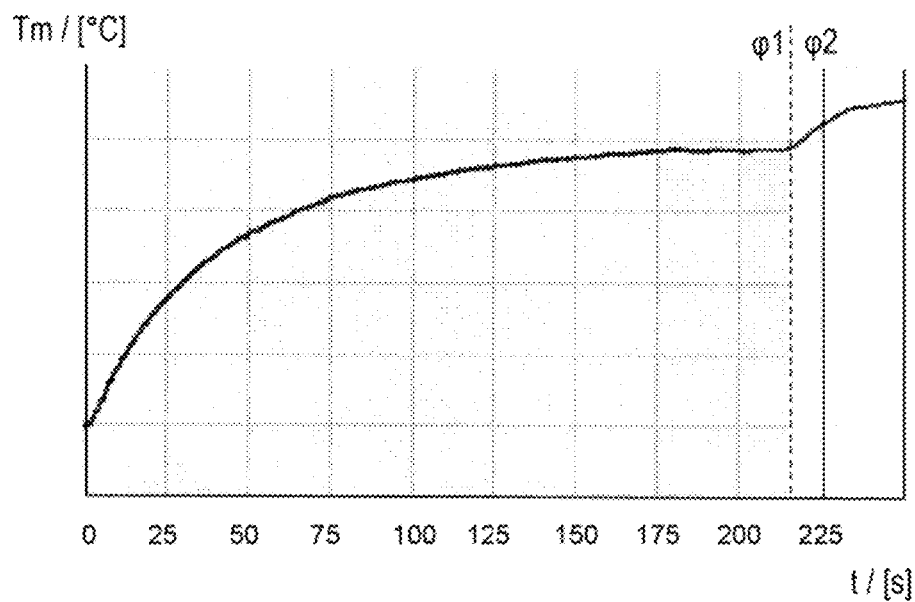
FIG. 4 shows a course of the temperature of the microwave generator when the setting value of the microwave distribution device is changed after the equilibrium temperature is reached.

FIG. 4 shows a course of the magnetron temperature Tm when the angle of rotation φ of the rotary antenna 7 is changed after the equilibrium temperature is reached.

If the angle of rotation is changed in the equilibrium state (here after t=215 s from the angle of rotation φ1 to the angle of rotation φ2), a gradient of the temperature curve which deviates from zero is produced on account of the new reflection portions. A positive gradient indicates that with the new rotary angle more power is reflected back to the magnetron 5, with a negative gradient less power is reflected than with the previous angle of rotation. In the diagram shown, a positive gradient is shown in the temperature profile. With the angle of rotation φ2, more power is consequently reflected back than with the angle of rotation φ1. The change in temperature on the magnetron 5 can be observed already after approx. one second after the angle of rotation φ is changed, in other words very quickly.

A statement about the portion of reflected microwave power can generally be made either on the basis of a comparison of the respective equilibrium states and/or by considering the sum and possibly the sign of the gradient when the equilibrium state is left. In practice, the consideration of the gradient is particularly advantageous, since this can be observed far more quickly.

Figure 5:
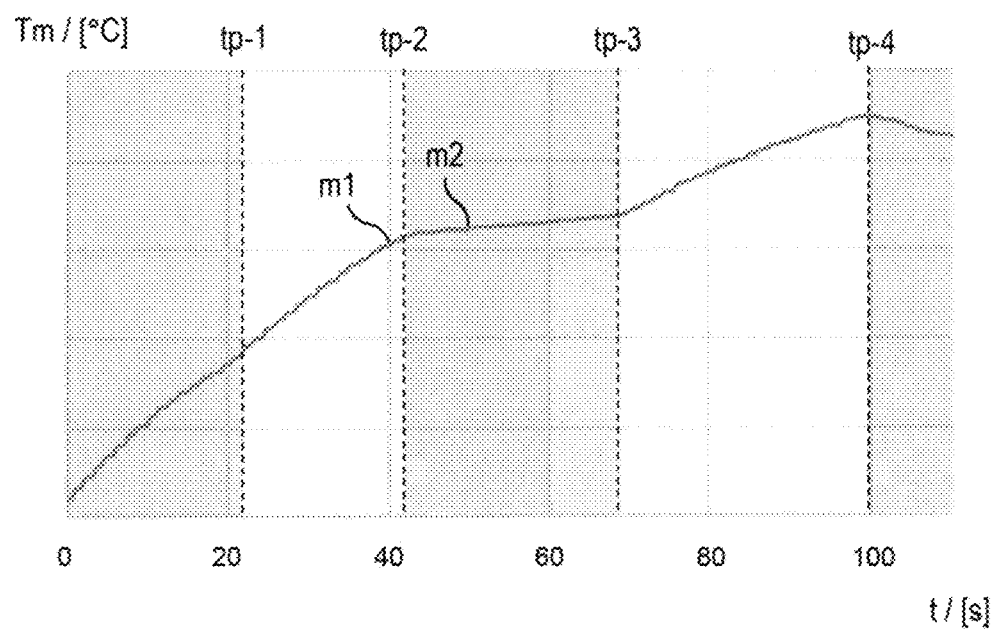
FIG. 5 shows a course of the temperature of the microwave generator when the setting value of the microwave distribution device is changed repeatedly before a respective equilibrium temperature is reached.

FIG. 5 shows a course of the magnetron temperature with a repeated change of the angle of rotation φ of the rotary antenna 7 before a respective equilibrium temperature is reached.

If the magnetron 5 is still not in its thermal equilibrium state for a currently set angle of rotation φ, with a change in the angle of rotation φ, no statement can be made on the basis of the sign of the gradient of the curve progression. For instance, in a temperature range below the lowest equilibrium temperature, each change in the angle of rotation φ results in an increase in the magnetron temperature Tm and thus in a positive gradient. However, in the majority of cases a change in the angle of rotation φ results in a sudden change in the gradient, which is expressed in a kink in the curve or in the temperature profile.

In order to be able to make statements about the portion of the reflected power of the current field distribution, a gradient m1 of the curve before the change in the angle of rotation φ can be compared with a gradient m2 shortly after the change in the angle of rotation φ. If the gradient m2 is greater than the gradient m1 of the previous angle of rotation φ, the portion of reflected power is also greater.

FIG. 5 shows in particular the course of the magnetron temperature Tm with a repeated change in the antenna position. The switchover times tp are identified with tp-1 to tp-4. A kink in the curve can be identified in each case at least for tp-2 to tp-4.

In order to evaluate the temperature curve, a difference Δm in the gradients m1 and m2 can be determined before and after the respective switchover times tp-1 to tp-4, for instance. Since the switchovers of the angle of rotation φ take place in short succession by comparison with reaching an equilibrium temperature, the curve sections outside of the switchover times tp-1 to tp-4 can be considered to be approximately linear.

The gradient difference Δm can be calculated, for instance, as $$\Delta m = m2(]tp+\Delta td; tp+\Delta td+\Delta td]) - m1([tp-\Delta t1; tp[),$$

i.e. from a difference in the gradient m2, which has been determined from a curve section after the switchover time tp and the duration Δtp, wherein this curve section begins delayed by the delay time Δtp after tp, and a gradient m1, which has been determined from a curve section of the duration Δti, which ends immediately before the switchover time tp. By means of the delay time Δtp, the thermal inertia of the system is taken into account. It normally amounts to just one to two seconds.

Δm<0 applies if less power is reflected back at the new angle of rotation φ. Δm=0 applies if the same amount of power is reflected back at the new angle of rotation φ, and Δm>0 applies if more power is reflected back at the new angle of rotation φ.

The present invention is naturally not restricted to the exemplary embodiment shown.

In general, "a", "an" etc. may be understood as meaning a singular or plural in particular in the sense of "at least one" or "one or more" etc., unless this is explicitly excluded for example by the expression "exactly one" etc.

Unless explicitly excluded, a number can also comprise exactly the specified number as well as a usual tolerance range.

The invention claimed is:

1. A method for operating a household microwave appliance, comprising:
controlling a microwave treatment operation as a function of a temperature of a microwave generator;
changing a field distribution in a cooking chamber of the household microwave appliance during the microwave treatment operation, wherein the microwave treatment operation is controlled as a function of a change in temperature of the microwave generator effected by the change in the field distribution; and
determining from the change in temperature an extent of a change in a portion of a microwave power radiated into the cooking chamber which portion is reflected from the cooking chamber back to the microwave generator.

2. The method of claim 1, wherein the field distribution is changed by changing a setting value of an operating parameter of a microwave distribution device changing the field distribution.

3. The method of claim 2, wherein the operating parameter is selected from the group consisting of angle of rotation of a rotary antenna, height position of a rotary antenna, angle of rotation of a mode stirrer, height position of a mode stirrer, angle of rotation of a rotary plate, microwave frequency, phase offset between different feed points, activation or deactivation of a feed of microwaves by way of a number of feed points, and change in a power distribution between a number of feed points.

4. The method of claim 2, wherein the operating parameter is an angle of rotation of a rotary antenna.

5. The method of claim 1, further comprising:
recording a temperature curve during the microwave treatment operation;
determining curve gradients before and after a switchover time, at which the field distribution has been changed in the cooking chamber; and
determining from the change in the curve gradients whether the back-reflected portion of the microwave power is higher for the field distribution before the switchover time or for the field distribution after the switchover time.

6. The method of claim 5, wherein one of the curve gradients is determined before the switchover time until immediately before the switchover time and/or another one of the curve gradients is determined from the switchover time, plus a predetermined delay time.

7. The method of claim 2, further comprising:
setting during the microwave treatment operation the operating parameter of the microwave distribution device on the basis of a strength of the back-reflected portion of the microwave power.

8. The method of claim 7, further comprising setting a setting value so that a relatively low back-reflected portion of the microwave power is produced.

9. The method of claim 7, further comprising setting a setting value so that a relatively high back-reflected portion of the microwave power is produced.

10. A household microwave appliance, comprising:
a cooking chamber;
a microwave generator for routing microwaves to the cooking chamber;
a temperature-determining apparatus for determining a temperature of the microwave generator;
a microwave distribution device designed to change a field distribution in the cooking chamber during a microwave treatment operation; and
a control device designed to control the microwave treatment operation as a function of the temperature of the microwave generator effected by a change in the field distribution,
wherein the microwave distribution device is designed to change the field distribution by changing a setting value of an operating parameter of the microwave distribution device, and
the control device is designed to determine from the change in temperature an extent of a change in a portion of a microwave power radiated into the cooking chamber which portion is reflected from the cooking chamber back to the microwave generator.

11. The household microwave appliance of claim 10, wherein the operating parameter is selected from the group consisting of angle of rotation of a rotary antenna, height position of a rotary antenna, angle of rotation of a mode stirrer, height position of a mode stirrer, angle of rotation of a rotary plate, microwave frequency, phase offset between different feed points, activation or deactivation of a feed of microwaves by way of a number of feed points, and change in a power distribution between a number of feed points.

12. The household microwave appliance of claim 10, wherein the control device is designed
to set during the microwave treatment operation the operating parameter of the microwave distribution device on the basis of a strength of the back-reflected portion of the microwave power.

13. The household microwave appliance of claim 10, wherein the control device is designed to set a setting value so that a relatively low back-reflected portion of the microwave power is produced.

14. The household microwave appliance of claim 10, wherein the control device is designed to set a set value so that a relatively high back-reflected portion of the microwave power is produced.

15. The household microwave appliance of claim 10, wherein the operating parameter is an angle of rotation of a rotary antenna.

16. A household microwave appliance, comprising:
a cooking chamber;
a microwave generator for routing microwaves to the cooking chamber:
a temperature-determining apparatus for determining a temperature of the microwave generator;
a microwave distribution device designed to change a field distribution in the cooking chamber during a microwave treatment operation; and
a control device designed to control the microwave treatment operation as a function of the temperature of the microwave generator effected by a change in the field distribution,
wherein the control device is designed
to record a temperature curve during the microwave treatment operation,
to determine curve gradients before and after a switchover time, at which the field distribution has been changed in the cooking chamber, and to determine from the change in the curve gradients whether the back-reflected portion of the microwave power is higher for the field distribution before the switchover time or for the field distribution after the switchover time.

17. The household microwave appliance of claim 8, wherein the control device is designed to determine one of the curve gradients before the switchover time until immediately before the switchover time and/or to determine another one of the curve gradients is determined from the switchover time, plus a predetermined delay time.

18. The household microwave appliance of claim 16, wherein the microwave distribution device is designed to change the field distribution by changing a setting value of an operating parameter of the microwave distribution device, and the operating parameter is an angle of rotation of a rotary antenna.

* * * * *